(12) United States Patent
Petersen et al.

(10) Patent No.: US 7,517,370 B2
(45) Date of Patent: Apr. 14, 2009

(54) BATTERY PASTE MATERIAL AND METHOD

(75) Inventors: Ralph A. Petersen, West Allis, WI (US); Ross A. Henning, Colgate, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 10/576,427

(22) PCT Filed: Oct. 21, 2004

(86) PCT No.: PCT/US2004/034710

§ 371 (c)(1),
(2), (4) Date: Apr. 20, 2007

(87) PCT Pub. No.: WO2005/043651

PCT Pub. Date: May 12, 2005

(65) Prior Publication Data

US 2007/0269592 A1 Nov. 22, 2007

Related U.S. Application Data

(60) Provisional application No. 60/512,951, filed on Oct. 21, 2003.

(51) Int. Cl.
*H01M 10/04* (2006.01)
*B05D 5/12* (2006.01)
(52) U.S. Cl. ............... 29/623.5; 427/126.1; 427/126.5; 141/1.1
(58) Field of Classification Search ............. 427/126.1, 427/126.5; 429/227, 228; 29/623.5; 141/1.1
See application file for complete search history.

(56) References Cited

U.S. PATENT DOCUMENTS

| 1,572,586 | A | | 2/1926 | Weir |
| 2,159,226 | A | | 5/1939 | Reid |
| 2,165,944 | A | | 7/1939 | Scott |
| 2,182,479 | A | | 12/1939 | Johnstone |
| 2,479,603 | A | * | 8/1949 | Chubb et al. ............... 429/227 |
| 2,686,213 | A | | 8/1954 | Smyth |
| 2,717,903 | A | | 9/1955 | Ruth |
| 2,872,333 | A | | 2/1959 | Adams |

(Continued)

FOREIGN PATENT DOCUMENTS

BE 877108 A1 10/1979

(Continued)

OTHER PUBLICATIONS

International Search Report for PCT/US2004/034710, date of mailing Mar. 24, 2005, 3 pages.

(Continued)

*Primary Examiner*—Stephen J. Kalafut
(74) *Attorney, Agent, or Firm*—Foley & Lardner LLP

(57) ABSTRACT

A method of making a battery plate includes mixing particles of tetrabasic lead sulfate with leady oxide to form a paste material. The particles have an average spherical particle diameter of less than 2.5 micrometers. The method also includes providing at least a portion of the paste material on a battery grid curing the battery grid and paste material at a temperature of less than approximately 48 degrees Celsius to produce a battery plate having a cured paste thereon.

48 Claims, 2 Drawing Sheets

U.S. PATENT DOCUMENTS

| | | |
|---|---|---|
| 3,001,013 A | 9/1961 | Stanton |
| 3,072,693 A | 1/1963 | Szczepanek et al. |
| 3,104,946 A | 9/1963 | Veal |
| 3,169,890 A | 2/1965 | Voss et al. |
| 3,173,810 A | 3/1965 | Voss et al. |
| 3,186,871 A | 6/1965 | Donohue |
| 3,194,685 A | 7/1965 | Malloy |
| 3,252,764 A | 5/1966 | Bruno, Jr. |
| 3,274,222 A | 9/1966 | Szczepanek |
| 3,312,647 A | 4/1967 | Szczepanek et al. |
| 3,323,859 A | 6/1967 | Szczepanek et al. |
| 3,384,458 A | 5/1968 | McCarthy et al. |
| 3,398,024 A | 8/1968 | Barnes et al. |
| 3,419,431 A | 12/1968 | Michaels |
| 3,449,166 A | 6/1969 | Jache |
| 3,480,478 A | 11/1969 | Sohn et al. |
| 3,536,659 A | 10/1970 | Breckheimer |
| 3,552,916 A | 1/1971 | White et al. |
| 3,702,265 A | 11/1972 | Snyder et al. |
| 3,734,694 A | 5/1973 | McCoy |
| 3,747,560 A | 7/1973 | Roberts et al. |
| 3,765,943 A | 10/1973 | Biagetti |
| 3,770,507 A | 11/1973 | Weissman et al. |
| 3,779,962 A | 12/1973 | Koenen et al. |
| 3,788,898 A | 1/1974 | Yarnell |
| 3,819,412 A | 6/1974 | Taylor et al. |
| 3,862,066 A | 1/1975 | Reiter et al. |
| 3,864,169 A | 2/1975 | Cestaro et al. |
| 3,881,954 A | 5/1975 | Maskalick |
| 3,887,693 A | 6/1975 | Escribano Nevado et al. |
| 3,894,886 A | 7/1975 | Pankow et al. |
| 3,899,349 A | 8/1975 | Yarnell |
| 3,942,433 A | 3/1976 | Wohlfarter |
| 3,951,688 A | 4/1976 | Pankow et al. |
| 3,973,991 A | 8/1976 | Cestaro et al. |
| 3,974,026 A | 8/1976 | Emson et al. |
| 4,000,100 A | 12/1976 | Baldyga |
| 4,019,431 A | 4/1977 | Bastgen |
| 4,020,882 A | 5/1977 | Foulkes |
| 4,024,055 A | 5/1977 | Blann |
| 4,050,482 A | 9/1977 | Ching et al. |
| 4,064,725 A | 12/1977 | Hug et al. |
| 4,110,519 A | 8/1978 | Nilsson |
| 4,118,219 A | 10/1978 | Elmore et al. |
| 4,140,589 A | 2/1979 | Hradcovsky et al. |
| 4,143,218 A | 3/1979 | Adams et al. |
| 4,159,975 A | 7/1979 | Praetorius et al. |
| 4,212,179 A | 7/1980 | Juergens |
| 4,230,612 A | 10/1980 | Praetorius et al. |
| 4,232,100 A | 11/1980 | Magnusson et al. |
| 4,315,829 A | 2/1982 | Duddy et al. |
| 4,319,002 A | 3/1982 | Witschard |
| 4,323,470 A | 4/1982 | Mahato et al. |
| 4,324,768 A | 4/1982 | Sugahara et al. |
| 4,326,017 A | 4/1982 | Will |
| 4,329,182 A * | 5/1982 | Sugahara et al. ............ 106/243 |
| 4,331,516 A | 5/1982 | Meighan |
| 4,336,236 A | 6/1982 | Kolakowski et al. |
| 4,338,163 A | 7/1982 | Rittenhouse |
| 4,346,022 A | 8/1982 | Wolcott et al. |
| 4,346,151 A | 8/1982 | Uba et al. |
| 4,381,250 A | 4/1983 | Rittenhouse |
| 4,383,011 A | 5/1983 | McClelland et al. |
| 4,387,142 A | 6/1983 | Lindholm et al. |
| 4,388,210 A | 6/1983 | Parker |
| 4,401,730 A | 8/1983 | Szymborski et al. |
| 4,407,911 A | 10/1983 | Hooke |
| 4,414,295 A | 11/1983 | Uba |
| 4,414,301 A | 11/1983 | Constein |
| 4,415,410 A | 11/1983 | Reich |
| 4,421,832 A | 12/1983 | Uba |
| 4,422,917 A | 12/1983 | Hayfield |
| 4,423,188 A | 12/1983 | Witschard |
| 4,475,453 A | 10/1984 | Davis |
| 4,501,669 A | 2/1985 | Hakansson et al. |
| 4,507,372 A | 3/1985 | Rowlette |
| 4,547,443 A | 10/1985 | Rowlette et al. |
| 4,551,401 A | 11/1985 | Wilson |
| 4,606,982 A | 8/1986 | Nelson et al. |
| 4,618,478 A | 10/1986 | McKinney |
| 4,637,966 A | 1/1987 | Uba et al. |
| 4,648,177 A | 3/1987 | Uba et al. |
| 4,656,706 A | 4/1987 | Mahato et al. |
| 4,697,511 A | 10/1987 | Davis et al. |
| 4,705,602 A | 11/1987 | Dahl |
| 4,707,272 A | 11/1987 | Kistler |
| 4,713,304 A | 12/1987 | Rao et al. |
| 4,758,372 A | 7/1988 | Eirich et al. |
| 4,780,379 A | 10/1988 | Puester |
| 4,867,886 A | 9/1989 | Botkins, Jr. |
| 4,889,778 A | 12/1989 | Misra et al. |
| 4,900,643 A | 2/1990 | Eskra et al. |
| 4,902,532 A | 2/1990 | Seo |
| 5,002,700 A | 3/1991 | Otagawa et al. |
| 5,017,446 A | 5/1991 | Reichman et al. |
| 5,021,166 A | 6/1991 | Torpey |
| 5,045,086 A | 9/1991 | Juergens |
| 5,045,170 A | 9/1991 | Bullock et al. |
| 5,047,300 A | 9/1991 | Juergens |
| 5,062,574 A | 11/1991 | Kéri |
| 5,091,273 A | 2/1992 | Hug et al. |
| 5,092,404 A | 3/1992 | Falsk et al. |
| 5,096,611 A | 3/1992 | Matthew et al. |
| 5,120,620 A | 6/1992 | Nelson et al. |
| 5,149,606 A | 9/1992 | Bullock et al. |
| 5,198,313 A | 3/1993 | Juergens |
| 5,252,105 A | 10/1993 | Witherspoon et al. |
| 5,273,554 A | 12/1993 | Vyas |
| 5,290,359 A | 3/1994 | Coonen et al. |
| 5,302,476 A | 4/1994 | Kao et al. |
| 5,314,766 A | 5/1994 | Witherspoon et al. |
| 5,348,817 A | 9/1994 | Rao et al. |
| 5,368,961 A | 11/1994 | Juergens |
| 5,382,482 A | 1/1995 | Suga et al. |
| 5,384,217 A | 1/1995 | Binder et al. |
| 5,426,144 A | 6/1995 | Lindner et al. |
| 5,434,025 A | 7/1995 | Rao et al. |
| 5,443,601 A | 8/1995 | Doeff et al. |
| 5,447,809 A | 9/1995 | Hafner et al. |
| 5,460,730 A | 10/1995 | Czerny et al. |
| 5,540,127 A | 7/1996 | Binder et al. |
| 5,652,074 A | 7/1997 | Larson, III et al. |
| 5,660,600 A | 8/1997 | Vyas |
| 5,690,718 A | 11/1997 | Sabin |
| 5,691,087 A | 11/1997 | Rao et al. |
| 5,750,608 A | 5/1998 | Lindner et al. |
| 5,871,862 A | 2/1999 | Olson |
| 5,874,186 A | 2/1999 | Rao et al. |
| 5,948,566 A | 9/1999 | Larsen et al. |
| 5,948,567 A | 9/1999 | Heller |
| 5,958,621 A | 9/1999 | Kao |
| 5,998,062 A | 12/1999 | Olson |
| 6,014,798 A | 1/2000 | Nitsche et al. |
| RE36,734 E | 6/2000 | Binder et al. |
| 6,096,820 A | 8/2000 | Lockledge et al. |
| 6,103,075 A | 8/2000 | Winsel et al. |
| 6,168,661 B1 | 1/2001 | Dinkelman |
| 6,180,286 B1 | 1/2001 | Rao et al. |
| 6,228,527 B1 | 5/2001 | Medeiros et al. |
| 6,274,274 B1 | 8/2001 | Schaeffer et al. |
| 6,306,945 B1 | 10/2001 | Lepilleur et al. |
| 6,414,071 B1 | 7/2002 | Wypart et al. |
| 6,442,811 B1 | 9/2002 | Dawood et al. |
| 6,454,977 B1 | 9/2002 | Kwok et al. |

| | | |
|---|---|---|
| 6,531,526 B1 | 3/2003 | Detterman et al. |
| 6,617,071 B2 * | 9/2003 | Chen et al. ............. 429/227 X |
| 6,733,547 B2 | 5/2004 | Ma |
| 6,749,950 B2 | 6/2004 | Zhang |
| 6,755,874 B2 | 6/2004 | Chen et al. |
| 6,780,913 B2 | 8/2004 | Sawada et al. |
| 6,803,151 B2 | 10/2004 | Chen et al. |
| 7,011,805 B2 | 3/2006 | Flores-Lira et al. |
| 7,041,265 B2 | 5/2006 | Ishida et al. |
| 2002/0124388 A1 | 9/2002 | Chen et al. |
| 2002/0177038 A1 | 11/2002 | Chen et al. |
| 2003/0030042 A1 | 2/2003 | Sawada et al. |
| 2003/0106205 A1 | 6/2003 | Ma |
| 2003/0157405 A1 | 8/2003 | Chen et al. |
| 2003/0165742 A1 | 9/2003 | Mann |
| 2003/0166752 A1 | 9/2003 | Detterman et al. |
| 2003/0175203 A1 | 9/2003 | Nitsche et al. |
| 2003/0183312 A1 | 10/2003 | Zhang |
| 2004/0121233 A1 | 6/2004 | Klein et al. |
| 2004/0147660 A1 | 7/2004 | Ishida et al. |
| 2004/0234852 A1 | 11/2004 | Klein et al. |
| 2005/0002373 A1 | 1/2005 | Watanabe et al. |
| 2005/0048372 A1 | 3/2005 | Chen et al. |
| 2005/0207969 A1 | 9/2005 | Flores-Lira et al. |
| 2005/0227149 A1 | 10/2005 | Mann |
| 2006/0088465 A1 | 4/2006 | Flores-Lira et al. |
| 2006/0093912 A1 | 5/2006 | Mayer |
| 2006/0110524 A1 | 5/2006 | Zhang et al. |

FOREIGN PATENT DOCUMENTS

| | | |
|---|---|---|
| EP | 196507 | 10/1986 |
| EP | 0 540 229 A1 | 5/1993 |
| EP | 0707718 | 4/1996 |
| EP | 1 261 049 A1 | 11/2002 |
| ES | 8801559 | 4/1988 |
| FR | 723018 | 4/1932 |
| GB | 1014694 | 12/1965 |
| JP | 58-147961 | 9/1983 |
| JP | 59-101773 | 6/1984 |
| JP | 63-269456 | 11/1988 |
| JP | 2001/229920 | 8/2001 |
| JP | 2002/231234 | 8/2002 |
| WO | WO 8200258 A1 | 2/1982 |
| WO | WO 02/069418 A1 | 9/2002 |
| WO | WO 2004/059772 A2 | 7/2004 |
| WO | WO 2005/004365 A2 | 1/2005 |
| WO | WO 2005/094501 A2 | 10/2005 |
| WO | WO 2005/108298 A1 | 11/2005 |

OTHER PUBLICATIONS

Pavlov D et al.: "Influence Of Paste Composition And Curing Program Used For The Production Of Positive Plates With PbSnCa Grids On The Performance Of Lead Acid Batteries", Journal Of Power Sources, Elsevier Sequoia S.A. Lausanne, Cr, vol. 114, No. 1, Feb. 25, 2003, pp. 137-159.

Drejer I et al.: "Investigation On Soaking And Formation Of Lead/Acid Battery Plates With Different Mass Structure", Journal Of Power Sources, Elsevier Sequoia S.A. Lausanne, Cr, vol. .85, No. 1, Jan. 2000, pp. 117-139.

Vildunen J K et al.: "Processes During Preparation Of Lead/Acid Battery Positive Plates From Tetrabasic Lead Sulfate (4bs) Pastes", Journal Of Power Sources, Elsevier Sequoia S.A. Lausanne, Ch, vol. 46, No. 2/3, 1 Oct. 1, 1993 pp. 269-283.

Grugeon-Dewaele, S., Laruelle, S., Joliveau-Vallat, F., Torcheux, Delahaye-Vidal, A., "Synthesis and Electrochemical Performances of Tribasic and Tetrabasic Lead Sulfates Prepared by Reactive Grinding", Journal of Power Sources 72, 1998, pp. 126-131, no month.

Vilhunen, J.K., Hornytzkyj, S. and Tummavuori, J. "The Influence of the Raw Material and Production Method on the Morphology, Microstructure, Chemical and Phase Composition of Tetrabasic Lead Sulfate Pastes", Journal of Power Sources, vol. 39, 1992, pp. 59-65, no month.

Pavlov, D. and Kapkov, N., "Lead-Acid Battery Pastes Containing $4PbO-PbSO_4$ and $Pb_3O_4$", J. Electrochemical Society, vol. 137, No. 1, Jan. 1990, pp. 16-28.

Yarnell, C.F. and Weeks, M.C., "The Oxidation of Tetrabasic Lead Sulfate to Lead Dioxide in the Positive Plate of the Lead-Acid Battery", Journal of the Electrochemical Society, Jan. 1979, vol. 126, No. 1, pp. 7-11.

McCabe, W.L. and Smith, J.C., "Unit Operations of Chemical Engineering" third edition, McGraw-Hill Book Company, 1976, 5 pages, no month.

Pavlov, D. and Papazov, G., "Dependence of the Properties of the Lead-Acid Battery Positive Plate Paste on the Processes Occurring During Its Production" Journal of Applied Electrochemistry, vol. 6, No. 4, Jul. 1976, pp. 339-345.

Biagetti, R.V. and Weeks, M.C., "Tetrabasic Lead Sulfate as a Paste Material for Positive Plates", Bell System Technical Journal, Sep. 1970, vol. 49, No. 7, pp. 1305-1319.

Burbank, J., "Anodic Oxidation of the Basic Sulfates of Lead" Journal of the Electrochemical Society, vol. 113, No. 1, Jan. 1966, pp. 10-14.

Written Opinion of the International Searching Authority for Application No. PCT/US2004/034710, mailing date Mar. 3, 2005, 7 pages.

* cited by examiner

BATTERY PASTE MATERIAL AND METHOD

CROSS-REFERENCE TO RELATED PATENT APPLICATIONS

The present application claims the benefit of U.S. Provisional Patent Application No. 60/512,951, filed Oct. 21, 2003. The following patent application is hereby expressly incorporated by reference in its entirety: U.S. Provisional Patent Application No. 60/512,951, filed Oct. 21, 2003.

BACKGROUND

The present invention relates generally to the field of batteries (e.g., lead-acid batteries such as automotive starting, lighting, and ignition (SLI) batteries; industrial batteries; commercial batteries; and marine batteries). More specifically, the present invention relates to materials for use in active materials for batteries and methods of making such materials.

Positive and negative plates or grids utilized in lead-acid batteries are made of lead or a lead alloy, and include a plurality of wires coupled to a plurality of nodes (e.g., a battery plate may include a frame comprising four sides with a lug or current collector extending from one of the sides and a network of wires or grid elements interconnected with a plurality of nodes).

At least a portion of the positive grids or plates have a material (e.g., a paste) applied thereto. The paste typically comprises lead oxide (PbO). The active material may also include one or both of tetrabasic lead sulfate ($4PbO \cdot PbSO_4$) (often abbreviated as "4BS") and tribasic lead sulfate ($3PbO \cdot PbSO_4 \cdot H2O$) (often abbreviated as "3BS"). According to an exemplary embodiment, an active material may comprise approximately 40% PbO and 60% 4BS. According to other exemplary embodiments, the active material may have a different composition (e.g., the active material may include between approximately 10% and 100% 4BS, etc.). The tetrabasic lead sulfate and tribasic lead sulfate may be provided in the form of individual crystals that are mixed into the lead oxide paste material. According to an exemplary embodiment, tetrabasic lead sulfate and tribasic lead sulfate may be provided by adding acid to a paste mix under appropriate mixing and plate curing conditions.

The positive plates having paste applied thereto are cured or dried to remove excess liquid in the paste and assembled into a battery (e.g., positive and negative plates are provided with a separator between them in a battery container, after which acid (e.g., sulfuric acid) is introduced into the battery). During curing, the tetrabasic lead sulfate and/or tribasic lead sulfate crystals grow or increase in size.

During battery formation (e.g., providing an initial charge to the battery), the components of the paste are converted to an active material such as lead dioxide ($PbO_2$) on the positive plates and sponge lead (Pb) on the negative plates. According to an exemplary embodiment, a sulfation reaction proceeds as acid is added to the battery according to the formula:

$$PbO+H_2SO_4=PbSO_4+H_2O$$

During formation, according to an exemplary embodiment, the reactions at the positive and negative plates proceed according to the following formulae:

Positive Plate $$PbSO_4+2H_2O=PbO_2+H_2SO_4+2H^++2e-$$

$$PbO+H_2O=PbO_2+2H^++2e-$$

Negative Plate $$PbSO_4+2H^++2e-=Pb+H_2SO_4$$

$$PbO+2H^++2e-=Pb+H_2O$$

Overall Reaction $$2PbSO_4+2H_2O=PbO_2+Pb+2H_2SO_4$$

$$2PbO=PbO_2+Pb$$

Cured positive plates containing tetrabasic lead sulfate as a component of the paste applied thereto may provide improved deep discharge cycle life as compared to cured positive plates utilizing tribasic lead sulfate as a component in the paste. B. Culpin has provided a review of 4BS positive plate chemistry and its benefits in J. Power Sources, 25, p. 305-311 (1989).

Another potential advantageous feature is that improved discharge capacity of positive plates utilizing tetrabasic lead sulfate may be obtained as compared to plates utilizing tribasic lead sulfate. For example, batteries produced using tetrabasic lead sulfate positive plate technology have been shown to yield up to approximately 20% improvements in reserve capacity (where reserve capacity is defined as the number of minutes at a 25 ampere discharge at 80° F. until a battery voltage is reduced to 10.5 volts).

Tetrabasic lead sulfate is conventionally provided having a crystal thickness of between approximately 10 and 20 micrometers and a length of between approximately 60 and 90 micrometers. One difficulty with using such tetrabasic lead sulfate is that the crystal size may not be optimum for allowing conversion of the paste materials into lead dioxide during the formation process. Another difficulty is that the use of such tetrabasic lead sulfate requires that the positive plates undergo a high temperature steam cure for approximately 1 hour or more.

One detrimental effect of the use of conventional tetrabasic lead sulfate crystals is that plates utilizing such crystals may exhibit incomplete formation (i.e., not all tetrabasic lead sulfate is converted to lead dioxide active material during initial charging). Accordingly, batteries produced with such plates may require follow-up boost charging to complete the formation process. The large crystals, coupled with incomplete formation, also may result in warpage of the formed positive plates.

Another difficulty in utilizing tetrabasic lead sulfate chemistry is that the paste mixing process and/or the plate curing step must be performed at elevated temperatures of at least 70° C. and more typically exceeding 80° C. Such elevated temperatures may not desirable for such manufacturing processes, and may result in increased manufacturing cost and decreased manufacturing efficiency.

There is thus a need to provide an improved method for producing tetrabasic lead sulfate materials for use in battery paste. There is also a need to provide a battery paste having tetrabasic lead sulfate with an optimum crystal size to enable relatively efficient conversion of the tetrabasic lead sulfate into lead dioxide active material. There is further a need to provide a relatively efficient and cost-effective method of producing battery paste for use in lead-acid batteries. There is further a need to provide a method for producing materials for use in battery paste that decrease the material requirements for production of a battery without sacrificing battery performance or cycle life and without reducing manufacturing efficiency. These and other needs may be met by one or more of the exemplary embodiments described herein.

SUMMARY

The present invention relates to a method of making a battery plate that includes mixing particles of tetrabasic lead sulfate with leady oxide to form a paste material. The particles have an average spherical particle diameter of less than approximately 2.5 micrometers. The method also includes providing at least a portion of the paste material on a battery grid curing the battery grid and paste material at a temperature of less than approximately 48 degrees Celsius to produce a battery plate having a cured paste thereon.

The present invention also relates to a method of making a plate for a battery that includes mixing particles of tetrabasic lead sulfate having an average spherical particle diameter of less than approximately 2 micrometers with leady oxide to form a paste. The method also includes coating at least a portion of a battery grid with the paste and heating the battery grid and paste material at a temperature of less than approximately 48 degrees Celsius to produce a battery plate having a cured paste thereon.

The present invention also relates to a method of making a battery that includes adding tetrabasic lead sulfate particles having an average spherical particle diameter of less than approximately 2.5 micrometers to leady oxide to form a paste material. The method also includes providing at least a portion of the paste material on a battery grid and curing the battery grid and paste material at a temperature of less than approximately 48 degrees Celsius to form a battery plate having a cured paste thereon. The method also includes providing the battery plate in a container to produce a battery and charging the battery.

DETAILED DESCRIPTION OF THE EXEMPLARY EMBODIMENTS

Figure 1:
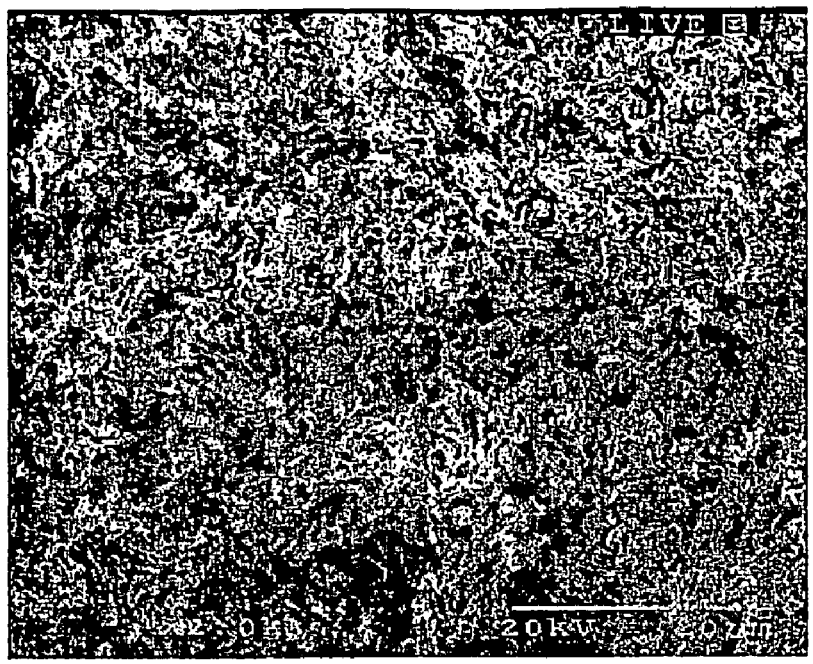
FIG. 1 shows a 2000× magnification scanning electron micrograph of a conventional positive plate utilizing a tribasic lead sulfate chemistry (i.e., without the use of tetrabasic lead sulfate) which had been cured at a low temperature of 46° C. for 16 hrs at 95% humidity.

According to an exemplary embodiment, a process or method of manufacturing positive plates or grids utilizing tetrabasic lead sulfate as a component of the battery paste (e.g., along with PbO) provides a savings in positive plate materials (e.g., between 4 and 8%), with little or no loss in lead acid battery performance or cycle life and little or no decline in manufacturing productivity.

According to an exemplary embodiment, the process allows paste mixing temperatures of less than 60° C. and curing temperatures of less than 46° C. to be utilized. Such temperatures are significantly lower than temperatures used for conventional tetrabasic lead sulfate plate chemistry manufacturing processes, which may range from approximately 70° to 80° or higher.

According to an exemplary embodiment, finely ground or milled tetrabasic lead sulfate particles at a loading level of approximately 1 wt % are added to leady oxide in an otherwise standard paste mixing process. According to an exemplary embodiment, the particles have an average spherical particle diameter of less than approximately 2.5 micrometers ($\mu m$) (i.e., the particles are generally spherical and have a particle diameter of less than approximately 2.5 micrometers). According to an exemplary embodiment, the particles have an average spherical particle diameter of up to approximately 2 micrometers. According to an exemplary embodiment, the particles have an average spherical particle diameter of approximately 1 micrometer. According to an exemplary embodiment, the particles have an average spherical particle diameter of approximately 2 micrometers. According to an exemplary embodiment, the particles have an average spherical particle diameter of between approximately 1 and 2 micrometers. According to other exemplary embodiments, the particles may have a different average spherical particle diameter (e.g., 2 micrometers or greater).

Following curing of the battery paste at a relatively low temperature, the particles will grow through nucleation and grain growth to sizes smaller than would be possible using conventional high temperature curing (e.g., between approximately 2 and 5 micrometers thick (preferably approximately 3 micrometers thick) and between approximately 20 and 30 micrometers long). Following the curing step, which causes growth of the tetrabasic lead sulfate crystals, the tetrabasic lead sulfate crystals comprise between approximately 50 and 60% by weight of the cured paste. According to other exemplary embodiments, a higher or lower acid content in the paste may be used to obtain levels of tetrabasic lead sulfate that are between approximately 10% and 100% by weight of the cured plate. According to still other exemplary embodiments, the total weight of tetrabasic lead sulfate may also vary based on the amount of tetrabasic lead sulfate particles utilized.

One advantageous feature of utilizing relatively finely ground tetrabasic lead sulfate particles or "seed crystals" is that greater than approximately 90% of all $PbSO_4$ may be converted into tetrabasic lead sulfate. No further curing process (e.g., a steam curing process) is required. In contrast, conventional tetrabasic lead sulfate production methods may require the use of a steam curing process, which adds an additional step to the manufacturing process.

The tetrabasic lead sulfate particles or "seed crystals" catalyze the full conversion of all tribasic lead sulfate chemistry into tetrabasic lead sulfate at a curing temperature of between approximately 46° and 48° C., provided that the humidity is maintained at approximately 95%. According to other exemplary embodiments, the humidity may be maintained at a different level (e.g., between approximately 80 and 100%). One advantageous feature of utilizing such temperatures is that lower manufacturing temperatures require less energy and avoid the higher costs associated with the use of warpage resistant fiber filled plastic stacking boards to hold the plates during the curing process. Further, high temperature paste mixing processes may require more expensive process equipment (e.g., vacuum-cooled paste mixers).

One advantageous feature of using small tetrabasic lead sulfate seed crystals is that the required amount of tetrabasic lead sulfate is reduced, which thus reduces the cost of this paste mix additive. According to an exemplary embodiment, each tetrabasic lead sulfate seed crystal develops into a single cured tetrabasic lead sulfate crystal. The greater the number of seed crystals, the greater the number of cured crystals. Because there are a greater number of seed crystals, the final cured crystals have a smaller size than those produced using conventional processes (e.g., the growth of each of the seed crystals into the larger, cured crystals is constrained due to the number of seed crystals provided). The relatively small cured crystal sizes may be produced regardless of curing temperature.

The tetrabasic lead sulfate particles are produced by jet milling larger particles of tetrabasic lead sulfate to obtain an average spherical particle diameter of between approximately 1 and 2 micrometers. According to an exemplary embodiment, a Fluid Energy Aljet Model 8 Micro-Jet Grinding System (manufactured by Fluid Energy Aljet of Telford, Pa.) may be utilized to produce tetrabasic lead sulfate seed crystals or particles having reduced spherical particle diameters (e.g., between approximately 1 and 2 micrometers). According to other exemplary embodiments, other types of jet mills or other milling or grinding equipment may be used. According to other exemplary embodiments, other methods of producing tetrabasic lead sulfate particles having particle sizes smaller than those conventionally used may also be utilized.

According to other exemplary embodiments, the average tetrabasic lead sulfate spherical particle size may differ. For example, the average particle size and loading levels may vary to optimize the conversion of tetrabasic lead sulfate to lead dioxide during the formation process. According to one embodiment, the spherical particle diameter of the tetrabasic lead sulfate particles may range between approximately 2 and 5 micrometers. According to another exemplary embodiment, the tetrabasic lead sulfate particles may be provided with a plurality of particle sizes (e.g., approximately 10% of the tetrabasic lead sulfate particles have average spherical particle diameters of between approximately 10 and 20 micrometers, and 90% of the tetrabasic lead sulfate particles have a spherical particle diameter of approximately 1 micrometer). The particular mixture of particle sizes may vary according to various considerations. According to another exemplary embodiment, the amount of loading of the paste with tetrabasic lead sulfate seed crystals may range between approximately 0.5% and 10.0% by weight. Other loading amounts may also be used according to other exemplary embodiments.

One advantageous feature of the use of tetrabasic lead sulfate particles having reduced sizes is that the tetrabasic lead sulfate crystals result in a cured tetrabasic lead sulfate crystal size that is small enough to provide relatively efficient conversion to lead dioxide positive active material in the first charge of the lead acid battery (commonly referred to as the formation process).

FIG. 1 shows a 2000× magnification scanning electron micrograph of a conventional positive plate utilizing a tribasic lead sulfate chemistry (i.e., without the use of tetrabasic lead sulfate) which had been cured at a low temperature of 46° C. for 16 hrs at 95% humidity. The small crystalline structure illustrated in the micrograph is characteristic of conventional tribasic lead sulfate chemistry, as was confirmed by x-ray diffraction and thermal gravimetric analysis (J. Materials Science Letters, Vol. 11, pp 369-372 (1992)).

Figure 2:
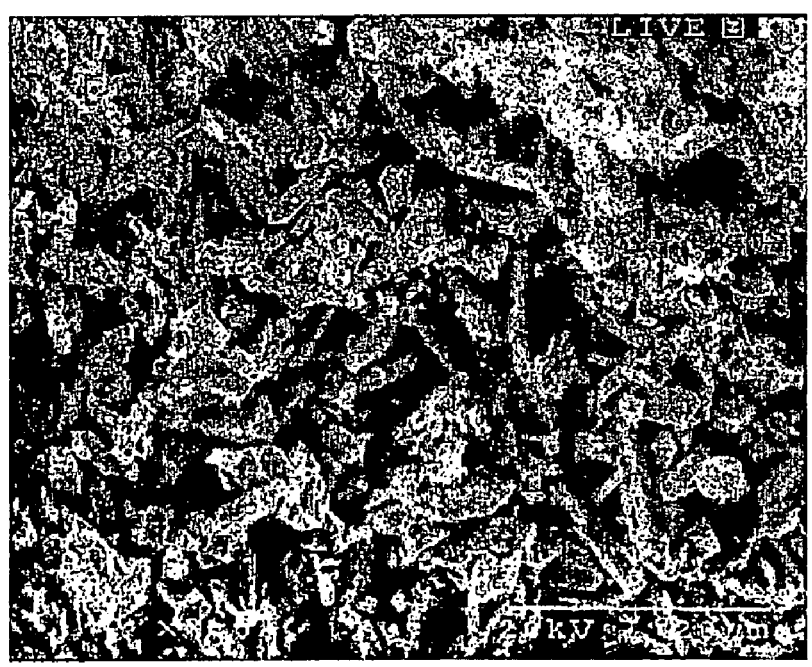
FIG. 2 shows a 2000× magnification scanning electron micrograph of a positive plate which had been cured under the same low temperature conditions as for the plate shown in FIG. 1, but which utilized a paste mix with 1 wt % of a tetrabasic lead sulfate seed crystal additive.

In contrast, FIG. 2 shows a scanning electron micrograph at the same 2000× magnification of a plate which had been cured under the same low temperature conditions as for the plate shown in FIG. 1, but which utilized a paste mix with 1 wt % of a tetrabasic lead sulfate seed crystal additive. The use of tetrabasic lead sulfate crystals according to an exemplary embodiment provides larger 2-3 micrometer thick crystals. Such cured crystal size is desirable since such crystals are optimally sized to convert to lead dioxide during the battery formation process, while at the same time yielding life and performance improvements over tribasic lead sulfate plate chemistry. X-ray diffraction and thermal gravimetric analyses confirmed that more than 90% of the $PbSO_4$ present in the plate had been converted into the tetrabasic lead sulfate crystalline form.

Figure 3:
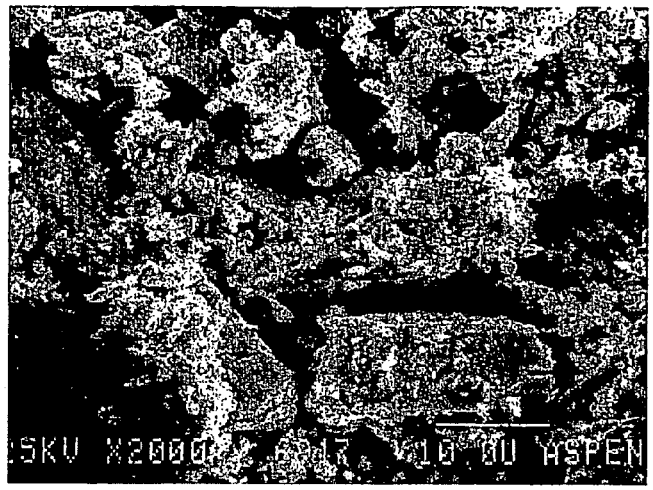
FIG. 3 shows a 2000× magnification scanning electron micrograph of a positive plate having larger sized tetrabasic lead sulfate crystals which was made using high temperature curing (approximately 100° C.) without the benefit of a tetrabasic lead sulfate seed crystal additive.

FIG. 3 shows a 2000× magnification scanning electron micrograph of a plate having larger sized tetrabasic lead sulfate crystals which was made using high temperature curing (approximately 100° C.) without the benefit of a milled tetrabasic lead sulfate seed crystal additive. The plates were steam cured at a temperature of approximately 100° C. The much larger, approximately 10 micrometer thick tetrabasic lead sulfate are more difficult to convert into lead dioxide positive plate active material during subsequent battery formation processes. Such plates also show a greater tendency toward warpage during the formation process.

Use of tetrabasic lead sulfate "seed crystals" of nominal 1-2 micrometer spherical particle diameter provides a relatively simple and robust process which assures that the proper size and amount of tetrabasic lead sulfate seed material is in the plate during the subsequent, critical plate curing step.

Figure 4:
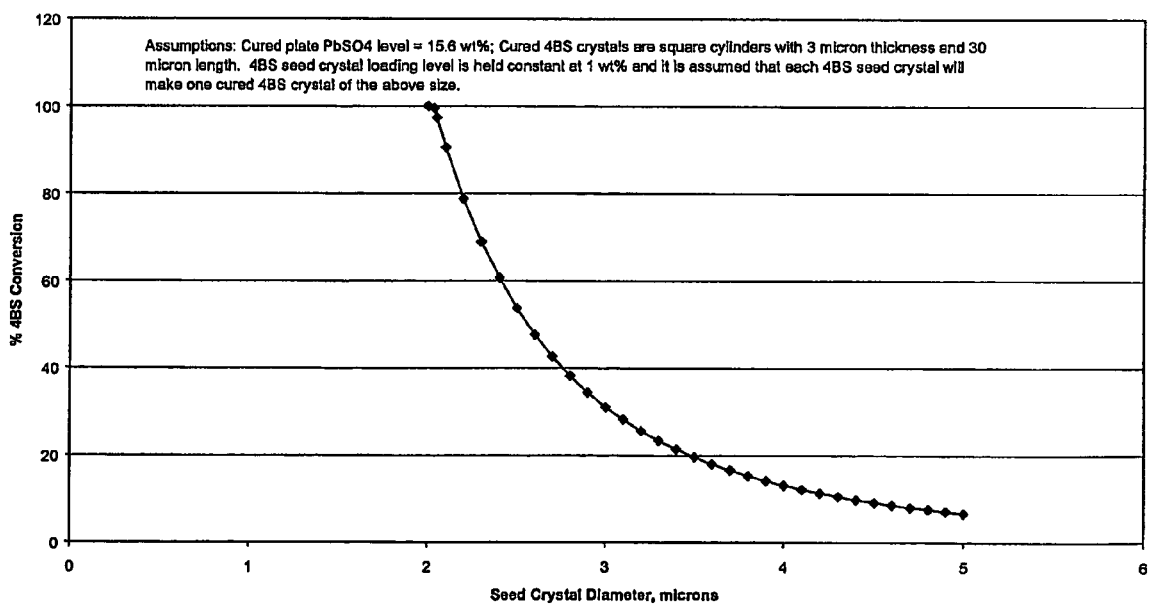
FIG. 4 is a graph illustrating a theoretical quantitative prediction of percent tetrabasic lead sulfate conversion in low temperature cured plates versus seed crystal spherical diameter.

The degree of conversion of $PbSO_4$ into the desired tetrabasic lead sulfate chemistry is also critically controlled by tetrabasic lead sulfate seed crystal particle size at the relatively low curing temperatures which would not otherwise create more tetrabasic lead sulfate crystals during curing. A theoretical quantitative prediction of percent tetrabasic lead sulfate conversion in low temperature cured plates versus seed crystal diameter is shown in FIG. 4. One assumption forming the basis of FIG. 4 is that low temperature cured tetrabasic lead sulfate crystals cannot grow larger than about 3 micrometers thick and 30 micrometers long. The number of these cured crystals determines the percent conversion to tetrabasic lead sulfate in the cured plates. Increasing the number of tetrabasic lead sulfate seed crystals per unit weight of additive via particle size reduction increases the percent conversion of tetrabasic lead sulfate in the cured plate by creating greater number of nucleation sites to create greater numbers of cured tetrabasic lead sulfate crystals.

FIG. 4 shows that seed crystal spherical diameters need to be no larger than about 2 micrometers in diameter to assure full conversion to tetrabasic lead sulfate crystals in the curing process. Still smaller seed crystal sizes would more robustly ensure full conversion to tetrabasic lead sulfate at low curing temperatures and could enable the use of a smaller amount of seed crystal additive to reduce process costs.

The paste material utilizing tetrabasic lead sulfate seed crystals yields improvements over conventional tetrabasic lead sulfate plate production by circumventing the need for an additional high temperature steam curing process. The method also generates optimally-sized post-cure tetrabasic lead sulfate crystals that are more efficiently converted to lead dioxide than possible using conventional tetrabasic lead sulfate plate production methods. The use of such seed crystals advantageously retains the benefits of tetrabasic lead sulfate plate chemistry such as a 5-15% increase in positive plate material utilization, improved discharge capacity stability during repetitive reserve capacity testing, and improved deep discharge cycle life.

Various advantageous features may be realized utilizing the teachings of the present application. For example, a method for producing or manufacturing battery plates utilizing tetrabasic lead sulfate paste chemistry in accordance with the teachings described herein may utilize lower temperatures than conventional methods. That is, low temperatures may be utilized to cure the battery paste once coated on a plate or grid.

Relatively small seed crystals of tetrabasic lead sulfate are used according to an exemplary embodiment to produce smaller crystals of tetrabasic lead sulfate after a curing operation than possible using conventional methods, while exhibiting a higher percentage of tetrabasic lead sulfate conversion to lead dioxide during a battery formation process than may be obtained using conventional manufacturing methods. Such a process may provide a relatively simple, robust, and cost effective means for making cured lead acid battery plates with relatively high percent conversion to optimally sized (2-5 micrometer thick) tetrabasic lead sulfate, which in turn can be relatively efficiently converted into lead dioxide active material during the battery formation process.

Other advantages may also be obtained. For example, active material paste weights may be reduced without degrading battery performance or cycle life and without significantly increasing manufacturing costs or decreasing manufacturing efficiency.

The following nonexclusive example illustrates features of the present invention:

EXAMPLE

Greater than 90 wt % purity tetrabasic lead sulfate (tribasic lead sulfate contaminant) was prepared in 60 lb lots in 50 gallons of hot aqueous slurries according to a procedure described by Biagetti and Weeks in the September 1970 issue of the Bell System Technical Journal. The dried material was jet milled to average volume based spherical particle diameters of 1 micrometer with a nominal standard deviation of 1 micrometers. Laser based particle size analyzers were used to quantitate all tetrabasic lead sulfate seed particle sizes.

The tetrabasic lead sulfate seed particles were added to a 2400 lb paste mix of conventional leady oxide to achieve a desired 1 wt % loading level (i.e., 24 lbs. of lead sulfate seeds were added to the mix). Normal state of the art mixing was then conducted via water additions, followed by the appropriate amount of 1.325 specific gravity sulfuric acid addition over a nominal 10 minute period to yield nominal peak mix temperatures of 60° C.

Machine pasted plates were then flash dried to a nominal moisture content of 10% and then subjected to 16 hours of curing at 46° C. and 95% humidity. The plates were then dried for a nominal 30 hours at 60° C. at low humidities not to exceed 50%. Conventional battery assembly and formations followed to make test batteries. Battery Council International (BCI) testing procedures and equipment were used to conduct performance and life testing of all batteries.

X-ray diffraction was used to confirm all tribasic lead sulfate and tetrabasic lead sulfate cured plate chemistries, while thermal gravimetric analysis was coupled with chemical sulfate analyses to quantitate these species according to the procedure described in the Journal of Material Sciences Letters, Vol 11, pp 369-372 (1992).

It is important to note that the various exemplary embodiments are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, etc.) without materially departing from the novel teachings and advantages of the subject matter recited herein. Other substitutions, modifications, changes and omissions may be made in the design, process parameters, material properties, operating conditions and other features of the preferred and other exemplary embodiments without departing from the scope of the present invention.

What is claimed is:

1. A method comprising:
    introducing particles of tetrabasic lead sulfate into a paste mix to form a paste material, the particles having an average diameter of less than approximately 2.5 micrometers;
    providing the paste material on a battery grid; and
    curing the paste material at a temperature of less than approximately 48 degrees Celsius.

2. The method of claim 1, wherein the particles have an average diameter of less than approximately 2 micrometers.

3. The method of claim 1, wherein the particles have an average diameter of between approximately 1 and 2 micrometers.

4. The method of claim 1, wherein the curing step is performed at a humidity level of approximately 95%.

5. The method of claim 1, wherein the curing step is performed at a temperature of between approximately 46 and 48 degrees Celsius.

6. The method of claim 1, wherein the cured paste material includes tetrabasic lead sulfate crystals having a thickness of between approximately 2 and 5 micrometers.

7. The method of claim 1, wherein the step of introducing particles of tetrabasic lead sulfate into a paste mix comprises adding the particles of tetrabasic lead sulfate at a loading level of between approximately 0.1 and 10.0 weight percent to the paste mix.

8. The method of claim 1, further comprising milling tetrabasic lead sulfate to form the particles of tetrabasic lead sulfate before introducing the particles into the paste mix.

9. The method of claim 8, wherein the step of milling tetrabasic lead sulfate utilizes a jet milling process.

10. The method of claim 8, further comprising determining the average diameter of the milled particles of tetrabasic lead sulfate.

11. The method of claim 10, wherein the step of determining the average diameter of the milled particles of tetrabasic lead sulfate utilizes a laser based particle size analyzer.

12. The method of claim 1, wherein the particles have a spherical shape.

13. The method of claim 1, wherein the average diameter of the particles is an average volume based spherical particle diameter.

14. The method of claim 13, wherein the average volume based spherical particle diameter is calculated by assuming that the particles are spherical to quantify the particle size.

15. The method of claim 1, further comprising adding at least one of water and sulfuric acid to the paste mix after introducing the particles of tetrabasic lead sulfate to form the paste material.

16. The method of claim 15, further comprising mixing the paste mix at a temperature of less than approximately 60 degrees Celsius.

17. The method of claim 1, wherein the particles of tetrabasic lead sulfate are seed crystals.

18. The method of claim 1, wherein the step of introducing particles of tetrabasic lead sulfate into a paste mix comprises adding approximately 24 pounds of tetrabasic lead sulfate seed crystals.

19. The method of claim 1, further comprising providing the battery grid in a battery and subjecting the battery to a formation process to convert the paste material to an active material on the battery grid.

20. A method of making a plate for a battery comprising:
mixing particles of tetrabasic lead sulfate having an average spherical particle diameter of less than approximately 2 micrometers with leady oxide to form a paste;
coating at least a portion of a battery grid with the paste; and
heating the battery grid and paste at a temperature of less than approximately 48 degrees Celsius to produce a battery plate having a cured paste thereon.

21. The method of claim 20, wherein the particles have an average spherical particle diameter of approximately 1 micrometer.

22. The method of claim 20, wherein the mixing step comprises adding the tetrabasic lead sulfate particles at a loading level of approximately 1 weight percent to the leady oxide.

23. The method of claim 20, wherein the mixing step is performed at a temperature of less than approximately 60 degrees Celsius.

24. The method of claim 20, wherein the particles of tetrabasic lead sulfate are spherical.

25. The method of claim 20, wherein the mixing step further comprising adding particles of tetrabasic lead sulfate that have particle sizes greater than 2 micrometers to the leady oxide during the mixing operation.

26. The method of claim 20, wherein the mixing step comprises mixing a first group of seed crystals of tetrabasic lead sulfate that have particle sizes greater that 2 micrometers and a second group of seed crystals having particle sizes less than 2 micrometers with the leady oxide to form the paste.

27. The method of claim 26, wherein the second group of seed crystals have particle sizes between 10 and 20 micrometers.

28. The method of claim 20, wherein the average spherical particle diameter is an average volume based spherical particle diameter.

29. The method of claim 28, wherein the average volume based spherical particle diameter is calculated by assuming that the particles are spherical to quantify the particle size.

30. The method of claim 20, wherein the step of mixing particles of tetrabasic lead sulfate with leady oxide to form a paste comprises adding water and sulfuric acid.

31. The method of claim 20, wherein the particles of tetrabasic lead sulfate are seed crystals that are configured to develop into larger tetrabasic crystals.

32. The method of claim 20, wherein the step of mixing particles of tetrabasic lead sulfate with leady oxide comprises adding approximately 24 pounds of the particles of tetrabasic lead sulfate.

33. The method of claim 20, further comprising providing the battery grid in a battery and subjecting the battery to a formation process to convert the paste to an active material on the battery grid.

34. The method of claim 20, further comprising milling tetrabasic lead sulfate to form the particles of tetrabasic lead sulfate before mixing the particles of tetrabasic lead sulfate with the leady oxide.

35. The method of claim 34, further comprising determining the average diameter of the milled particles of tetrabasic lead sulfate.

36. The method of claim 35, wherein the step of determining the average diameter of the milled particles of tetrabasic lead sulfate utilizes a laser based particle size analyzer.

37. A method of making a battery comprising:
adding tetrabasic lead sulfate seed crystals having an average spherical particle diameter of less than approximately 2.5 micrometers to leady oxide to form a paste material;
coating at least a portion of a battery grid with the paste material;
curing the paste material at a temperature of less than approximately 48 degrees Celsius to form a battery plate having a cured paste thereon;
providing the battery plate in a container to produce a battery; and
charging the battery.

38. The method of claim 37, wherein the seed crystals have an average spherical particle diameter of between approximately 1 and 2 micrometers.

39. The method of claim 37, wherein the cured paste includes tetrabasic lead sulfate crystals having a thickness of between approximately 2 and 5 micrometers.

40. The method of claim 39, wherein the cured paste includes between 50 and 60 weight percent tetrabasic lead sulfate crystals after the curing step.

41. The method of claim 37, wherein the curing step is performed at a temperature of between approximately 46 and 48 degrees Celsius.

42. The method of claim 37, wherein the step of adding tetrabasic lead sulfate seed crystals comprises adding approximately 1 weight percent of the seed crystals to the leady oxide.

43. The method of claim 37, wherein the average spherical particle diameter is an average volume based spherical particle diameter that is calculated by assuming that irregular shaped particles are spherical to quantify the particle size.

44. The method of claim 37, wherein the step of adding tetrabasic lead sulfate seed crystals to leady oxide to form a paste material comprises adding water and sulfuric acid.

45. The method of claim 37, wherein the seed crystals are configured to develop into larger tetrabasic crystals.

46. The method of claim 37, wherein the step of charging the battery acts to convert the paste to an active material on the battery plate.

47. The method of claim 37, further comprising milling tetrabasic lead sulfate to form the tetrabasic lead sulfate seed crystals before adding the seed crystals to the leady oxide.

48. The method of claim 47, further comprising determining the average diameter of the milled tetrabasic lead sulfate seed crystals.

* * * * *